United States Patent [19]

Adorjan

[11] 4,139,024
[45] Feb. 13, 1979

[54] THERMAL INSULATION STRUCTURE

[75] Inventor: Alexander S. Adorjan, Pearland, Tex.

[73] Assignee: General Electric Company, Fairfield, Conn.

[21] Appl. No.: 540,509

[22] Filed: Jan. 13, 1975

Related U.S. Application Data

[63] Continuation of Ser. No. 167,258, Jul. 29, 1971, abandoned.

[51] Int. Cl.² .............................................. F16L 9/14
[52] U.S. Cl. .............................. 138/149; 138/DIG. 9; 62/465
[58] Field of Search ......... 138/149, 103, 178, DIG. 9; 264/46.5, 46.6; 62/465, 466, DIG. 13; 428/310, 311, 313, 315

[56] References Cited

U.S. PATENT DOCUMENTS

| | | | |
|---|---|---|---|
| 2,779,066 | 1/1957 | Gaugler et al. | 62/DIG. 13 |
| 2,962,183 | 11/1960 | Rill et al. | 62/DIG. 13 |
| 3,007,596 | 11/1961 | Matsch | 62/DIG. 13 |
| 3,091,946 | 6/1963 | Kesling | 264/46.6 X |
| 3,280,849 | 10/1966 | Rendos et al. | 138/149 |
| 3,390,703 | 7/1968 | Matlow | 138/149 X |
| 3,392,220 | 7/1968 | Jennings | 264/46.5 |
| 3,531,233 | 9/1970 | Max | 264/46.6 X |
| 3,554,237 | 1/1971 | Pelley et al. | 138/149 X |
| 3,556,158 | 1/1971 | Schneider | 264/46.6 X |
| 3,693,665 | 9/1972 | Veerling et al. | 138/149 |
| 3,728,187 | 4/1973 | Martin | 138/149 X |

*Primary Examiner*—Charles E. Phillips
*Assistant Examiner*—James E. Bryant, III

[57] ABSTRACT

A double-walled, hermetically sealed structure with the cavity between the walls containing a polyurethane foam blown with a fluorinated hydrocarbon. During fabrication the cavity is evacuated to remove air and water vapor and then refilled with a fluorinated hydrocarbon.

7 Claims, 2 Drawing Figures

INVENTOR:
ALEXANDER S. ADORJAN

BY R. H. Quist
ATTORNEY

THERMAL INSULATION STRUCTURE

This is a continuation, of application Ser. No. 167,258, filed July 29, 1971, now abandoned.

BACKGROUND OF THE INVENTION

This invention relates generally to a thermal insulation structure of a double-walled type, and more particularly to such a structure where the cavity between the walls is hermetically sealed.

In considering the environment to which an oil well casing would be exposed in the Prudhoe Bay area of Alaska, certain new requirements were developed. In this vicinity there exists a layer of permafrost; i.e., a layer of subsurface soil which may extend down 2,000 feet and is permanently frozen. If a well is drilled utilizing the same approach followed in temperate climates the oil (which is approximately 180° F) passing through the well casing will cause the permafrost about the well casing to melt. The melting of the permafrost causes it to subside, exerting downward drag on the well casing which may cause failure. Moreover, if the flow of oil is terminated, the soil surrounding the casing will eventually refreeze which may produce forces sufficient to cause the casing to collapse.

SUMMARY OF THE INVENTION

In a preferred form of the invention, a double-walled thermal insulating structure is provided with the cavity between the walls hermetically sealed. The outer surface of the inner wall is covered with a reflective film. The cavity further contains a polyurethane foam which has been blown in an atmosphere of a fluorinated hydrocarbon such as trichloromonofluoromethane, $CCl_3F$, FREON-11. The cavity also contains a gaseous fluorinated hydrocarbon such as difluorodichloromethane, $CCl_2F_2$, FREON-12.

DESCRIPTION OF THE PREFERRED EMBODIMENT

Figure 1:
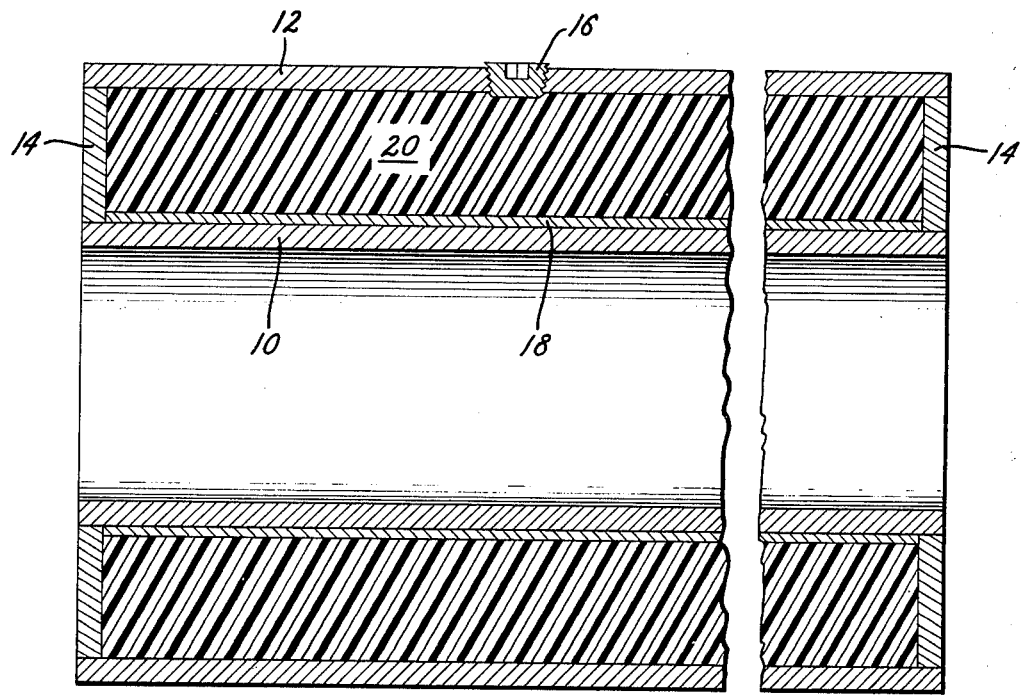
FIG. 1 is a schematic cross-section of one embodiment of the thermal insulating structure of this invention.

Referring to FIG. 1, a double-walled, heat insulating structure is illustrated having inner wall 10 and outer wall 12 connected by end walls 14. Inner and outer walls 10 and 12 are fabricated of a material having sufficient structural strength for conveying liquids. End walls 14 are designed to have a low heat conductivity by utilization of a suitable material such as stainless steel, and hermetically seal the cavity between walls 10 and 12. Although not shown in FIG. 1, end walls 14 may also be designed to have a long heat transfer path by any of the well-known techniques of the prior art such as that shown in U.S. Pat. No. 3,275,345.

Plug 16 is provided in outer wall 12 for a purpose to be described later.

In accordance with the invention, a composite heat insulating material is contained between the double walls of the conduit. Immediately adjacent to inner wall 10 is a layer of reflective material 18. Material 18 may be an aluminized plastic film such as Mylar. For some purposes it may be found that sufficient heat insulation characteristics are achieved without reflective material 18. Filling the remaining space in the cavity is a polyurethane foam 20. Foam 20 may be of an opened-cell or closed-cell type and is blown in a fluorinated hydrocarbon atmosphere; e.g., trichlorofluoromethane, $CCl_3F$, FREON-11.

Figure 2:
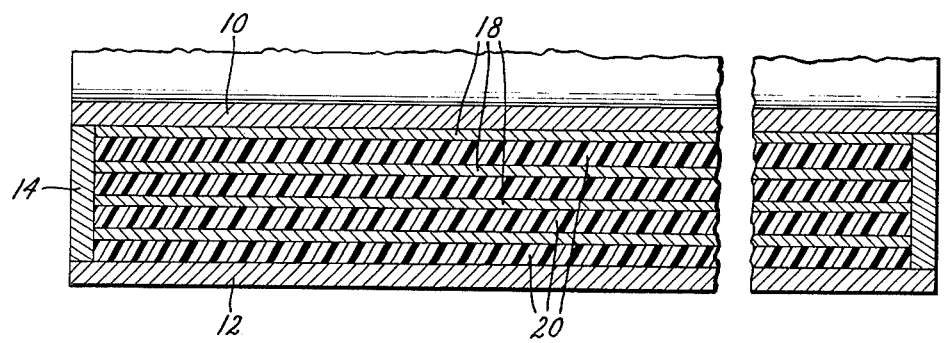
FIG. 2 is a detail of a portion of FIG. 1 showing another embodiment of the invention.

In some cases it may be desired to alternate layers of reflective material 18 with layers of foam 20, as shown in FIG. 2.

Film 18 and foam 20 are placed in the cavity between the double walls prior to the time end walls 14 are secured to inner and outer walls 10 and 12.

The space between the double walls is then evacuated to a pressure below 0.01 millimeters of mercury by removing plug 16. This ensures the removal of air and water vapor which would cause deterioration of the insulating qualities of foam 20 (also called aging of the foam). It is then refilled with a fluorinated hydrocarbon; e.g., difluorodichloromethane, $CCl_2F_2$, FREON-12. The FREON-12 has the advantage of a low thermal conductivity (about one-third that of air) while not causing aging of the foam. The pressure of the FREON-12 is a critical factor in forming the composite of the insulation of this invention. If the pressure is raised high enough to reach the dew point of the gas the resulting condensate will tend to circulate within the double-walled cavity, condensing on the cooler wall and evaporating on the warmer wall. Thus the temperature to which the inner and outer walls of the casing will be exposed must be considered. A pressure is consequently chosen which will preclude condensation within the operating temperature range of the structure while still being maximized. The FREON-12 impedes any leakage of air into the cavity, and prevents the aging of foam 20. Polyurethane foam of the type described herein which has not aged has a thermal conductivity, $K = 0.117$ Btu/hr ft$^2$ F/in. at 75° F mean temperature, while aged foam has a thermal conductivity, $K = 0.20$ Btu/hr ft$^2$ F/in. at the same mean temperature. Thus preventing aging of the foam preserves the insulation capabilities of the structure.

Preventing aging of the foam is also necessary prior to fabrication of the heat insulating structure. Thus unless the foam will be used within one or two days it should be kept in a hermetically sealed container which has been evacuated and backfilled with a fluorinated hydrocarbon as described above.

As is well known, heat may be transfered by conduction, convection, or radiation. As indicated above conduction is retarded through the use of low thermal conductivity foam and gas. The presence of the foam also prevents heat transfer by convection which would otherwise occur by circulation of the gas between the hot and cold walls of the structure. Finally the reflective film reduces heat transfer by radiation.

In the application of this heat insulating structure to a well casing, conduit, etc., the particular dimensions employed will vary. In order to provide some basis for comparison, however, for a 40 foot long well casing, with the inner steel pipe having an outside diameter of 5½ inches, and the outer steel pipe having an inside diameter of 8-11/16 inches, a heat loss of about 1190 Btu/hr. was calculated. This assumed the inside pipe contained oil at 180° F, and the outside was exposed to air and kept at 20° F.

While a particular embodiment of a heat insulating structure, and the process for making it, has been shown and described, it will be obvious that changes and modifications can be made without departing from the spirit of the invention and the scope of the appended claims.

I claim:

1. A double-walled heat insulating structure for use in an application where the high and low temperatures to which the structure will be exposed constitute an operating temperature range comprising:
   an inner wall;
   an outer wall spaced from said inner wall;
   sealing means forming a gas-tight cavity between said inner and outer walls;
   a polyurethane foam contained within said cavity; and
   said cavity also containing a free gaseous fluorinated hydrocarbon at a pressure which is maximized without exceeding that at which it will condense in the operating temperature range of the structure.

2. A double-walled heat insulating structure in accordance with claim 1 wherein:
   said polyurethane foam is blown with a fluorinated hydrocarbon.

3. A double-walled heat insulating structure in accordance with claim 2 wherein:
   said fluorinated hydrocarbon is trichloromonofluoromethane.

4. A double-walled heat insulating structure in accordance with claim 3 wherein:
   said polyurethane foam is of the opened-cell type.

5. A double-walled heat insulating structure in accordance with claim 3 wherein:
   said polyurethane foam is of the closed-cell type.

6. A double-walled heat insulating structure for use in an application where the high and low temperatures to which the structure will be exposed constitute an operating temperature range comprising:
   an inner wall having a heat reflecting film on its outer facing surface;
   an outer wall spaced from said inner wall;
   sealing means forming a gas-tight cavity between said inner and outer walls;
   a polyurethane foam contained within said cavity; and
   said cavity also containing free gaseous difluorodichloromethane at a pressure which is maximized without exceeding that at which it will condense in the operating temperature range of the structure.

7. A double-walled heat insulating structure for use in an application where the high and low temperatures to which the structure will be exposed constitute an operating temperature range comprising:
   an inner wall;
   an outer wall spaced from said inner wall;
   sealing means forming a gas-tight cavity between said inner and outer walls;
   said cavity containing alternating layers of heat reflecting film and a polyurethane foam blown with a fluorinated hydrocarbon; and
   said cavity also containing a free gaseous fluorinated hydrocarbon at a pressure which is maximized without exceeding that at which it will condense in the operating temperature range of the structure.

* * * * *